United States Patent [19]

Bickle et al.

[11] Patent Number: 5,716,144
[45] Date of Patent: Feb. 10, 1998

[54] SLIDING SURFACE BEARING

[75] Inventors: Wolfgang Bickle, Reilingen; Manfred Müller, Untereisescheim; Thomas Storch, Brühl; Herbert Rubel, Sinsheim-Weller, all of Germany

[73] Assignee: Kolbenschmidt Aktiengesellschaft, Neckarsulm, Germany

[21] Appl. No.: 577,284

[22] Filed: Dec. 22, 1995

[30] Foreign Application Priority Data

Dec. 29, 1994 [DE] Germany ............... 44 47 046.0

[51] Int. Cl.⁶ ........................................... F16C 17/10
[52] U.S. Cl. .................................. 384/275; 384/396
[58] Field of Search ........................... 384/275, 294, 384/288, 396, 300

[56] References Cited

U.S. PATENT DOCUMENTS

| 528,278 | 10/1894 | Roberts et al. ............. 384/296 |
| 3,269,785 | 8/1966 | Lefevre . |
| 4,845,817 | 7/1989 | Wilgus . |
| 5,509,738 | 4/1996 | Haynes et al. ............. 384/275 |

FOREIGN PATENT DOCUMENTS

| 2159801 | 6/1973 | Germany . |
| 3243831 | 2/1984 | Germany . |
| 4032929 | 4/1992 | Germany . |
| 2187803 | 9/1987 | United Kingdom . |

Primary Examiner—Lenard A. Footland
Attorney, Agent, or Firm—Sprung Kramer Schaefer & Briscoe

[57] ABSTRACT

A sliding surface bearing for two components of a planar swivel joint for doors and flaps, which are contacting each other and are connected by a bolt, consists of a sliding material clamped into the bore of a component with press fit. To avoid the abrasion of lacquer a collar bushing is provided on both sides of the bore.

1 Claim, 1 Drawing Sheet

SLIDING SURFACE BEARING

BACKGROUND OF THE INVENTION

This invention relates to a sliding surface bearing for two components of a planar swivel joint for doors and flaps, preferably on motor vehicles, which are contacting each other and are connected by a bolt, comprising a maintenance-free sliding material clamped into the bore of a component with press fit.

The sliding surface bearing for two components of a planar swivel joint for doors and flaps, in particular on motor vehicles, which are contacting each other and are connected by a bolt, generally consists of a rolled bushing made of a strip section (sheet bar) of a sliding material with a collar formed on both sides and a cross joint extending over the entire width and closed in the clamped condition, which expands in the vicinity of the collars to form a V-shaped slot.

What is also known is a hinge connection, where the gudgeons on the one or other hinge half are lined with a bushing, into which the hinge bolt is pressed with running fit (DE-A-1 931 749, DE-A-1 784 004). In the DE-B-2 159 801 a one-piece hinge for doors and flaps of apertures on motor vehicles is disclosed, where a collar end bearing bushing with a cross joint is pressed into the gudgeon of the intermediate movable hinge half and is surrounded by the other hinge half like a fork, with the hinge bolt being inserted with interference fit. This should also include the possibility of a closed cross joint in the vicinity of the collar of the collar bushing, which according to our current experience is not possible for reasons of manufacturing technology.

Sliding surface bearings of this type have the disadvantage that upon application of a lacquer coating on the components of the swivel joint in the vicinity of the V-shaped slot or the cross joint of the collar of the collar bushing clamped into the bores, lacquer particles get stuck which during the movement of the swivel joint are rubbed off as a result of the friction of the bolt head of the bolt connection. These rubbed off particles then drop for instance on the floor of the motor vehicle and are enclosed by the subsequently applied lacquer coating. This does not only impair the optical appearance of the lacquer coating, but there are produced points where corrosion might start. To avoid this, comparatively extensive rework will have to be done.

A further disadvantage of the collar bushings with axially extending cross joint is the great dependence of the achievable collar diameter on the diameter of the bushing. Only about 1.4 times the bushing diameter can be achieved for the collar diameter. Therefore, the absorption of axial forces is restricted considerably.

SUMMARY OF THE INVENTION

It is the object of the present invention to design the above-described sliding surface bearing such that the abrasion of lacquer particles by the bolt head of the bolt connection in the vicinity of the collar of the collar bushing is avoided.

The solution of this object consists in that from both sides of the bore in a component of the swivel joint a collar bushing formed by deep-drawing an annular circular blank is inserted, whose collar-free end faces are lying closely beside each other in the bore. As such collar bushing has no cross joints or slots in the collar, it is not possible that lacquer particles get stuck between the bolt head of the bolt connection and the collar, so that there is no abrasion of lacquer.

In accordance with the further embodiment of the sliding surface bearing in accordance with the invention a chamfered portion with an angle of 20° to 45° or a depression in the shape of a circular segment is provided in the collar bushing's area of transition between collar and bushing, into which depression the sliding material can flow, which had been displaced as a result of the deformation or calibration process when the collar bushing was pressed into the bore of the components, so that the wall thickness of the collar of the collar bushing remains unchanged.

The invention provides for a backlash-free support between the collar bushings and the bolt disposed therein for their entire service life. By means of the inventive design of the sliding surface bearing it is likewise possible to produce an increased collar surface for the safe absorption of axial forces, independent of the cylindrical bore of the bearing.

The invention is represented in the drawing by way of example and will be explained in the following.

DETAILED DESCRIPTION OF THE INVENTION

Figure 1:
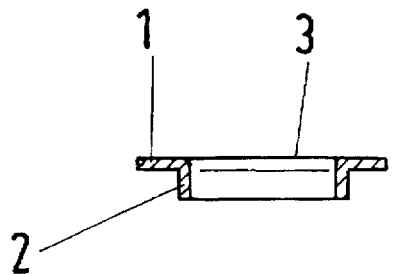
FIG. 1 is a sectional view of a collar bushing according to the invention.

FIG. 1 shows a collar bushing (3) consisting of the collar (1) and the bushing (2), which was made from an annular circular blank by means of deep-drawing.

Figure 2:
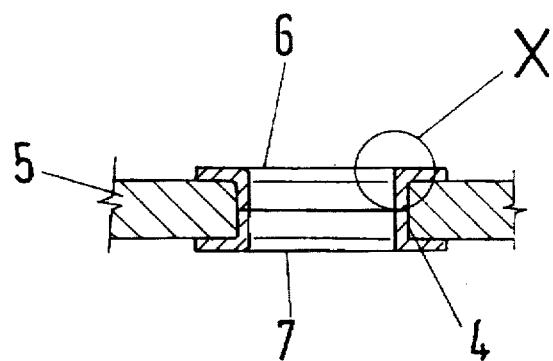
FIG. 2 is a sectional view of a bearing using the bushing of FIG. 1.
Figures 3, 4:
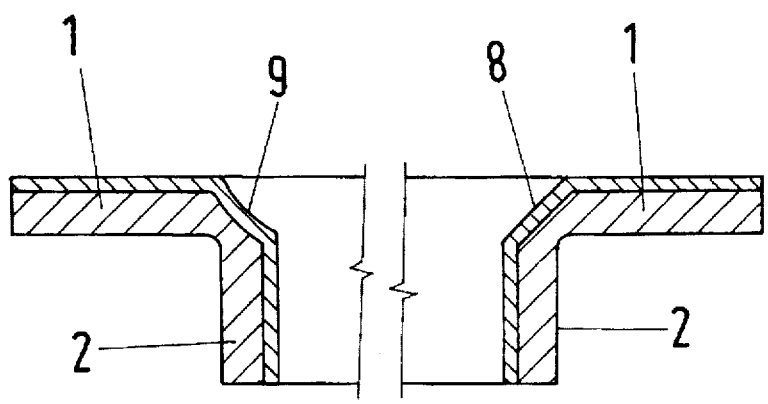
FIGS. 3 and 4 are alternative embodiments of detail X in FIG. 2.

In FIG. 2 a collar bushing (6, 7) is clamped from both sides with press fit into the bore (4) of a component (5) of a not represented swivel joint. Upon insertion of the collar bushings (6, 7) the excess sliding material is axially upset in the vicinity of the bushing (2) and thus changed, so that the inner surfaces of the collars of the two collar bushings (6, 7) firmly rest against the surface of the bore (4). In order to ensure that the axial deformation of the bushing (2) gets the desired direction, as is shown by the detail representations (X) of FIG. 2 in FIG. 3 and FIG. 4, a chamfered portion (8) or a depression (9) having the shape of a circular segment in cross-section, is provided in the area of transition between the bushing (2) and the collar (1). These depressions (9) or chamfered portions (8) prevent the excess sliding material from flowing back to the area of the collar (1).

What is claimed is:

1. A sliding surface bearing for a swivel joint having a component with a bore, the bearing comprising two collar bushings, each comprising a collar portion and a bushing portion formed by deep-drawing an annular blank and having a transition portion comprising either a circular segment depression, or an inclined surface with an angle of 20° to 45° degrees, between the collar portion and the bushing portion, wherein the bushings are press fit into opposite sides of the bore with end faces of the bushing portions resting against each other and wherein the press fitting of the bushings effects material flow into the transition portions, whereby the wall thickness of the collar portions remain unchanged to provide a backlash-free support between the collar bushings and a bolt disposed therein.

* * * * *